United States Patent
Onuoha et al.

(10) Patent No.: US 11,981,605 B2
(45) Date of Patent: May 14, 2024

(54) TWO-COMPONENT WATER-BASED CEMENTITIOUS ADHESIVE WITH REDUCED VISCOSITY

(71) Applicant: SIKA TECHNOLOGY AG, Baar (CH)

(72) Inventors: Ukiwo Onuoha, Bassersdorf (CH); Steffen Maier, Wettingen (CH); Oscar Larsson, Lakewood, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 803 days.

(21) Appl. No.: 17/051,158

(22) PCT Filed: May 3, 2018

(86) PCT No.: PCT/EP2018/061417
§ 371 (c)(1),
(2) Date: Oct. 27, 2020

(87) PCT Pub. No.: WO2019/210965
PCT Pub. Date: Nov. 7, 2019

(65) Prior Publication Data
US 2021/0238095 A1    Aug. 5, 2021

(51) Int. Cl.
| | | |
|---|---|---|
| C04B 28/14 | (2006.01) | |
| C04B 22/14 | (2006.01) | |
| C04B 24/02 | (2006.01) | |
| C04B 24/26 | (2006.01) | |
| C04B 24/32 | (2006.01) | |
| C04B 40/00 | (2006.01) | |
| C04B 103/00 | (2006.01) | |
| C04B 103/40 | (2006.01) | |
| C04B 111/00 | (2006.01) | |

(52) U.S. Cl.
CPC ........... *C04B 28/14* (2013.01); *C04B 22/147* (2013.01); *C04B 24/023* (2013.01); *C04B 24/2623* (2013.01); *C04B 24/2641* (2013.01); *C04B 24/2676* (2013.01); *C04B 24/32* (2013.01); *C04B 40/0039* (2013.01); *C04B 2103/0093* (2013.01); *C04B 2103/406* (2013.01); *C04B 2103/408* (2013.01); *C04B 2111/00637* (2013.01); *C04B 2111/00681* (2013.01)

(58) Field of Classification Search
CPC . C04B 28/14; C04B 24/2676; C04B 24/2623; C04B 24/023; C04B 2103/406; C04B 24/32; C04B 22/147; C04B 40/0039; C04B 24/2641

USPC ........................................................ 524/271
See application file for complete search history.

(56) References Cited

U.S. PATENT DOCUMENTS

| | | | |
|---|---|---|---|
| 5,151,130 A | 9/1992 | Croft et al. | |
| 5,272,200 A | 12/1993 | Yamauchi et al. | |
| 2015/0141554 A1* | 5/2015 | Mikaelsson | C04B 24/26 |
| | | | 524/5 |

FOREIGN PATENT DOCUMENTS

| | | |
|---|---|---|
| CN | 104428269 A | 3/2015 |
| DE | 19801892 A1 | 7/1999 |
| DE | 198 12 246 A1 | 9/1999 |
| DE | 101 50 600 A1 | 4/2003 |
| EP | 0490191 A2 | 6/1992 |
| EP | 0620243 A1 | 10/1994 |
| WO | 02/48228 A2 | 6/2002 |
| WO | 2014/009298 A2 | 1/2014 |

OTHER PUBLICATIONS

Feb. 22, 2019 International Search Report issued in International Patent Application No. PCT/EP2018/061417.
Feb. 22, 2019 Written Opinion of the International Searching Authority issued in International Patent Application No. PCT/EP2018/061417.
Emulsion Polymerization and Emulsion Polymers, Peter A. Lovell & Mohamed S. El-Aasser Ed., 1997, pp. 1-236.

* cited by examiner

*Primary Examiner* — Hui H Chin
(74) *Attorney, Agent, or Firm* — Oliff PLC

(57) ABSTRACT

A composition including: a first component A, includes: between 68 and 99.9 wt.-% of an aqueous dispersion of at least one polymer, the aqueous dispersion including the polymer with an amount of between 20 and 90 wt.-%; between 0 and 2 wt.-% of a nonionic or ionic dispersing agent; a second component B, includes: between 10 and 30 wt.-% of a nonionic, non-aqueous liquid carrier, between 0 and 20 wt.-% of calcium sulfate, between 10 and 89.9 wt.-% of at least one hydraulic binder, between 0 and 10 wt.-% of a thixotropy agent; wherein both components A and B are prepared and stored separately and mixed directly before application; and with the proviso that the first component A furthermore includes: between 0.1 and 15 wt.-% of a monovalent metal salt, and the second component B furthermore comprises: between 0.1 and 25 wt.-% of a polyamine.

14 Claims, No Drawings

TWO-COMPONENT WATER-BASED CEMENTITIOUS ADHESIVE WITH REDUCED VISCOSITY

TECHNICAL FIELD

The invention relates to accelerated, two-component water-based cementitious compositions and the use thereof as elastic adhesives, sealants, and coatings.

BACKGROUND OF THE INVENTION

Two-component compositions, based on aqueous dispersions of polymers in a first component A and a hydraulic binder composition in a second component B, are known in the field of sealants and adhesives. These two compositions A and B cure or dry after mixing into elastic adhesives and sealants with high Shore A hardness and good adhesion properties, especially on porous substrates such as concrete.

Such compositions are, for example, described in WO 2014/009298. This disclosure teaches adhesive and/or sealing formulations which are provided as a kit-of-parts comprising, as component B, a hydraulic binder composition being a storage-stable, liquid composition comprising gypsum, Portland cement, aluminate cement or mixtures thereof and an anhydrous liquid which has a boiling point greater than 175° C. at 1 atmosphere pressure and, as component A, a liquid polymer composition.

Such two-component cementitious water-based compositions have, mainly due to their high content of hydraulic binder such as cement, some inherent drawbacks. A commonly encountered issue are the high viscosity, especially of the hydraulic binder component B, but also of the polymer component A and the mixture of the two components. The high viscosity of components A or B or of the mixture of these two components makes it difficult and cumbersome to obtain a homogeneously mixed mixture. Equally, application of the mixed composition, especially in the form of thin films, is often hindered or difficult to achieve.

It is thus desirable to obtain a two-component water-based cementitious composition that has a significantly lower viscosity in component A, component B, and/or the mixture of component A and B, while still exhibiting the same, or possessing even better, mechanical and adhesive properties.

SUMMARY OF THE INVENTION

The object of the present invention is to provide a two-component composition that is curable to form an elastic adhesive, sealant, or coating material with good mechanical and adhesive properties, comprising a component A containing an aqueous polymer dispersion and a component B containing a hydraulic binder mixture, while at least one of the components A and B has an exceptionally low viscosity, which facilitates mixing of the components A and B and application of the mixed composition.

The composition after mixing of the two components A and B is especially suitable for sealing joints or surfaces, but may also be advantageously employed as elastic adhesive or dampening material.

Surprisingly, it has been found that adding a monovalent metal salt to component A considerably lowers the viscosity of component A, while adding a polyamine to component B significantly lowers the viscosity of component B. Mixtures of components A and B after addition of one or both of the mentioned additives also exhibit significantly lower viscosities, which facilitates a homogeneous mixture and the application of the mixed composition. Surprisingly, the mechanical and adhesive properties of the cured compositions are not adversely affected by addition of said additives, and in some embodiments they are even improved.

According to another aspect of the present invention, a method for sealing a joint, adhering two substrates, or coating a surface is provided.

DETAILED DESCRIPTION OF THE INVENTION

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" in the present document encompasses on the one hand a collective of chemically uniform macromolecules which nevertheless differ in respect of degree of polymerization, molar mass, and chain length, which collective has been prepared through a polymerization reaction (chain growth addition polymerization, free radical polymerization, polyaddition, polycondensation). On the other hand the term also encompasses derivatives of such a collective of macromolecules from polymerization reactions, in other words compounds which have been obtained by reactions, such as additions or substitutions, for example, of functional groups on existing macromolecules and which may be chemically uniform or chemically non-uniform.

"Molecular weight" of oligomers or polymers is understood in the present document to be the molecular weight average $M_n$ (number average), which is typically determined by means of GPC against polystyrene as standard and using tetrahydrofuran as solvent using a styrene-divinylbenzene gel column with porosity of 100 Angstrom, 1000 Angstrom and 10000 Angstrom at 35° C.

The term "liquid" means herein that the described substance is a nearly incompressible fluid that conforms to the shape of its container but retains a (nearly) constant volume independent of pressure.

The term "cementitious" refers to compositions including hydraulic binding agent such as cement and to the cured products thereof.

The unit term "wt.-%" means percentage by weight, based on the weight of the respective total composition, if not otherwise specified. The terms "weight" and "mass" are used interchangeably throughout this document.

All industrial norms and standard methods mentioned in this document are referring to the respective current versions at the time of filing.

The term "(meth)acrylic" designates methacrylic or acrylic. Accordingly, the term "(meth)acrylate" designates methacrylate or acrylate.

The term "polyacrylate polymer" designates polymers resulting from the free-radical polymerization of two or more (meth)acrylate monomers. Copolymers of the (meth)acrylate monomers and copolymers of (meth)acrylate monomers with other vinyl group containing monomers are also included within the term polyacrylate polymer". The terms "polyacrylate polymer", "polyacrylate" and "acrylate polymer" are used interchangeably.

The term "dispersion" refers to a physical state of matter that includes at least two distinct phases, wherein a first phase is distributed in a second phase, with the second phase being a continuous medium. Preferably, the dispersion comprises a solid phase which is dispersed as solid particles in a continuous liquid phase.

The term "shelf life" designates a time period after which a dispersion composition has substantially coagulated, separated or settled such that it cannot be readily applied to a surface of a substrate as homogeneous, uniform film or bead.

The term "storage stable composition" designates a composition, which has a shelf life of greater than six months when stored at room temperature and at a relative humidity (abbreviated "r.h.") of 50% when stored in a closed container.

The term "room temperature" (abbreviated "RT") designates a temperature of 23° C.

The term "standard pressure" designates an absolute pressure of 1 bar.

The present invention relates in a first aspect of the invention to a water-based two-component composition comprising:

A) a first component A, comprising, based on the total weight of component A:
   a1) between 68 and 99.9 wt.-% of an aqueous dispersion of least one polymer P, said aqueous dispersion comprising said polymer P with an amount of between 20 and 90 wt.-%, based on the weight of said aqueous dispersion;
   a2) between 0 and 2 wt.-% of a nonionic or ionic dispersing agent D;
B) a second component B, comprising, based on the total weight of component B:
   b1) between 10 and 30 wt.-% of a nonionic, non-aqueous liquid carrier LC,
   b2) between 0 and 20 wt.-% of calcium sulfate,
   b3) between 10 and 89.9 wt.-% of at least one hydraulic binder H,
   b4) between 0 and 10 wt.-% of a thixotropy agent T;
wherein both components A and B are prepared and stored separately and mixed directly before application; and with the proviso that the first component A furthermore comprises:
   a3) between 0.1 and 15 wt.-% of a monovalent metal salt M, and the second component B furthermore comprises:
   b5) between 0.1 and 25 wt.-% of a polyamine PA.

The water-based two-component composition according to the present invention comprises a first component A, comprising, based on the total weight of component A:

Between 68 and 99.9 wt.-% of an aqueous dispersion of least one polymer P, said aqueous dispersion comprising said polymer P with an amount of between and 90 wt.-%, based on the weight of said aqueous dispersion; and between 0 and 2 wt.-% of a nonionic or ionic dispersing agent D, with the proviso that the first component A furthermore comprises between 0.1 and 15 wt.-% of a monovalent metal salt M.

Component A comprises 68 and 99.9 wt.-% of an aqueous dispersion of least one polymer P, said aqueous dispersion comprising said polymer P with an amount of between 20 and 90 wt.-%, based on the weight of said aqueous dispersion.

The term "aqueous dispersion of a polymer" refers to a polymer dispersed in water as the main carrier. Preferably, the "aqueous" refers to a 100% water carrier.

Preferably, the dispersion adhesive composition comprises less than 5% by weight, preferably less than 1% by weight, based on the total weight of the component A, of volatile organic compounds having a boiling point of less than 150° C.

Measurement of the solids content of an aqueous dispersion of a polymer is typically conducted in accordance with EPA Test Method 24 (40 CFR 60, Appendix A).

A variety of polymeric materials may be included in the aqueous dispersion of at least on polymer P. Broadly, the dispersions of polymer particles may include: (meth)acrylics; vinyls; oil-modified polymers; polyesters; polyurethanes; polyamides; chlorinated polyolefins; and, mixtures or copolymers thereof. Further, said polymers should typically have a glass transition temperature ($T_g$) of from −60° to 70° C. In one embodiment, soft polymers are used, such as certain acrylates and butene based polymers. In such case, the $T_g$ of the polymer preferably is between −60° to 15° C. Preferably, the at least one polymer P which is a soft polymer has a glass transition temperature ($T_g$), determined with DSC according to ISO 11357 standard, of −60-+10° C., more preferably of −60-0° C., most preferably −50-−10° C.

In case harder polymers are used, such as styrene based or methacrylate based polymers the $T_g$ preferably ranges from 15° to 60° C., and most preferably from 25° C. to 50° C.

The term "glass transition temperature" refers to the temperature measured by differential scanning calorimetry (DSC) according to the ISO 11357 standard above which temperature a polymer component becomes soft and pliable, and below which it becomes hard and glassy. The measurements can be performed with a Mettler Toledo 822e device at a heating rate of 2° C./min. The $T_g$ values can be determined from the measured DSC curve with the help of the DSC software. The $T_g$ is the temperature at which there is a 'sudden' increase in the specific heat (Cp). This is manifested by a shift in the baseline of the DSC curve. The International Confederation of Thermal Analysis proposes an evaluation procedure to be used to determine the $T_g$. According to this procedure two regression lines R1 and R2 are applied to the DSC curve: the regression line before the event (R1) and the regression line at the inflection point (R2). These two lines define the glass transition temperature ($T_g$) as the intersection between R1 and R2. It should be noted that the values for the $T_g$ obtained by DSC are dependent on the heating rate chosen during the experiment. Generally the heating rate used by DSC measurements is 2-5° C./min.

As used herein terms including "meth" in parentheses, such as "(meth)acrylate," are intended to refer either to the acrylate or to the methacrylate, or mixtures of both. Similarly, the term (meth)acrylamide would refer either to the acrylamide or to the methacrylamide, or mixtures of both, as one skilled in the art would readily understand.

As preferred polymers may be mentioned: i) pure acrylate copolymers obtainable as the polymerization product of a plurality of acrylic monomers such as (meth)acrylic acid, (meth)acrylic monomers containing a hydroxyl group, (meth)acrylic acid esters and (meth)acrylonitrile; ii) styrene-acrylate copolymers obtainable as the polymerization product of a monomer mixture comprising styrene and/or substituted styrene in an amount of up to 100 wt. %, preferably of from 30 to 90 wt. % and more preferably of from 40 to 80 wt. %, based on total monomers, and one or more acrylic monomers; and, such as (meth)acrylic acid, (meth)acrylic monomers containing a hydroxyl group, (meth)acrylic acid esters and (meth)acrylonitrile; and, iii) ethylene vinyl acetate copolymers obtainable as the polymerization product of vinyl acetate, ethylene, and optionally other co-monomers.

A monomer is a substantially mono-disperse compound of low molecular weight—typically less than one thousand Daltons—that is capable of being polymerized.

An aqueous dispersion of polymer particles is intended to encompass the meaning of latex polymer and water-dispersed polymeric solids.

A "latex" polymer means a dispersion or emulsion of polymer particles formed in the presence of water and one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

It is preferred that the aqueous dispersion of at least one polymer P is directly provided as a dispersion in the water based medium, which dispersion may then be mixed with additional water, additional dispersible polymers P, and other additives, as required, to form component A. It is possible to prepare such a dispersion entirely from water and (re)dispersible polymers P, or it is possible to add the same or different (re)dispersible polymers P to an already prepared dispersion of polymers P, or it is possible to dilute an already prepared dispersion of polymers P with water. Such dispersions may be provided using known commercial products such as: Styropor P555 (styrene homopolymer available from BASF Aktiengesellschaft); for styrene butadiene copolymers, Lipaton SB 3040, Lipaton SB 2740 (Polymer Latex GmBH), Styrolux 684 D (BASF Aktiengesellschaft) and, Synthomer 20W20 (Synthomer Chemie); Synthomer VL 10286 and Synthomer 9024 (styrene/butadiene/acrylonitrile terpolymer, Synthomer Chemie); for styrene acrylate copolymers, Alberdingk® H 595, Alberdingk® AS 6002 (both Alberdingk Boley), Rhodopas DS 913 (Rhodia), Acronal® 290D, Acronal® S 400, Acronal® DS 5011 (BASF Aktiengesellschaft), Vinnapas SAF 54 (Wacker Polymer Systems), Mowilith LDM 6159 (Celanese) and Lipaton AE 4620 (Polymer Latex GmBH); and, B60A (pure acrylate dispersion available from Rohm & Haas). Other exemplary commercially available latex polymers include: AIRFLEX® EF811 (available from Air Products); EPS 2505 (available from EPS/CCA); and, NEOCAR® 2300, NEOCAR® 820 and NEOCAR® 2535 (available from Dow Chemical Co.).

Alternatively, the aqueous dispersion of at least one polymer P may be provided by polymerizing appropriate monomer mixtures as will be described herein below. P. A. Lovell, M. S. El-Aasser (Editors), "Emulsion Polymerization and Emulsion Polymers", John Wiley and Sons, Chichester, UK, 1997 is mentioned as an appropriate reference for this. The monomer mixture should generally comprise at least one unsaturated monomer selected from the group consisting of: (meth)acrylonitrile; alkyl (meth)acrylate esters; (meth)acrylic acids; vinyl esters; and, vinyl monomers.

Suitable alkyl esters of acrylic acid and methacrylic acid for this process are for example those derived from C1 to C14 alcohols and thereby include as non-limiting examples: methyl (meth)acrylate; ethyl (meth)acrylate; isopropyl (meth)acrylate; butyl (meth)acrylate; isobutyl (meth)acrylate; n-pentyl (meth)acrylate; neopentyl (meth)acrylate; cyclohexyl (meth)acrylate; 2-hexyl (meth)acrylate; 2-ethylhexyl (meth)acrylate; isobornyl (meth)acrylate; 2-hydroxyethyl (meth)acrylate, 3-hydroxypropyl (meth)acrylate, 4-hydroxybutyl (meth)acrylate, and ε-caprolactone adducts thereof; and, di(meth)acrylate esters of alkane diols such as 1,6-hexane diol diacrylate.

Suitable vinyl esters include vinyl acetate, vinyl propionate, vinyl versatate and vinyl laurate. Suitable vinyl monomers include: ethylene; propene; butene; iso-butene; 1,3-butadiene; isoprene; styrene; α-methyl styrene; t-butyl styrene; vinyl toluene; divinyl benzene; heterocyclic vinyl compounds; and, vinyl halides such as chloroprene. Preferably the vinyl monomers include ethylene, styrene, butadiene and isoprene.

In certain embodiments, the monomer mixture may comprise a carbonyl monomer that is a mono-olefinically unsaturated monomer having an aldehyde group or a ketone group. The mono-olefinic unsaturation in the carbonyl monomers of this invention is typically provided by (meth)acrylate, (meth)acrylamide, styryl or vinyl functionalities. Preferably the carbonyl monomer is selected from the group consisting of: acrolein; methacrolein; vinyl methyl ketone; vinyl ethyl ketone; vinyl isobutyl ketone; vinyl amyl ketone; acetoacetoxy esters of hydroxyalkyl (meth)acrylates; diacetoneacrylamide (DAAM); diacetone(meth)acrylamide; formylstyrol; diacetone (meth)acrylate; acetonyl acrylate; 2-hydroxypropyl acrylate-acetyl acetate; 1,4-butanediol acrylate acetylacetate; and, mixtures thereof.

The polymerization of the monomer mixture should be conducted under stirring or mixing in a water based-medium. The volume of the water based medium is adjusted so that the obtained polymer emulsion offers the desired physical properties. These processes should give aqueous dispersions with a solids content of from at least 40 to 70% by weight, preferably between 20 and 90% by weight. Moreover, where the resultant emulsions should be VOC compliant, the amount of hydrophilic co-solvents, such as lower alcohols, which are present in the water-based medium should be minimized. Generally, the amount of water in component A is about 10 to 80 wt %, preferably about 25 to 75% by weight, based on the weight of component A.

Usually the polymerization will be carried out in an inert gas atmosphere, or at least in the absence of oxygen, at a temperature of from 20° to 110° C. If appropriate, conventional ionic, non-ionic or amphoteric emulsifiers can be added to the polymerization batch, said emulsifiers being described in, for example, M. Ash & I. Ash, Handbook of Industrial Surfactants, 3rd Edition, Synapse Information Resources Inc.

Preferably the polymerization is a free radical emulsion polymerizations in which the free radicals are generated by chemical initiators such as: peroxygen compounds, including potassium persulphate and ammonium persulphate; hydrogen peroxide; and, organic peroxides and hydroperoxides, including cumene hydroperoxide and t-butyl hydroperoxide. Further suitable initiators are preferably graft-linking, water-soluble redox systems which comprise, by way of example: hydrogen peroxide and a heavy metal salt; hydrogen peroxide and sulphur dioxide; or, hydrogen peroxide and sodium metabisulphate. The initiators are used, for example, in an amount of from 0.05 to 5% by weight, preferably from 0.1 to 4% by weight, based on the monomers. The free-radical-formers can be charged in the aqueous emulsifier solution or be added during the polymerization in doses. Oil soluble initiators such as t-butyl hydrogen peroxide are preferred.

During an emulsion polymerization, either the monomers can be metered directly into the initially taken mixture or they can be added in the form of an aqueous emulsion or mini-emulsion to the polymerization batch. For this purpose, the monomers are emulsified in water using the abovementioned conventional emulsifiers.

If appropriate, conventional regulators which reduce the molecular weight of the polymers forming can be used. Said regulators are preferably organic compounds which comprise sulfur in bound form, for example mercaptans, di- and polysulphides, esters and sulphides of thio- and dithiocarboxylic acids and enol sulphides. Halogen compounds, aldehydes, ketones, formic acid, enol ethers, enamines, hydroxylamine, halogenated hydrocarbons, alcohols, ethylbenzene and xylene are also suitable as regulators.

The aqueous dispersion of at least one polymer P thus preferably comprises free-radically polymerized polymer(s) obtained from ethylenically unsaturated monomers. Preferably, the such polymers contain principal monomers selected from the group consisting of C1-C20-alkyl (meth)acrylates, vinyl esters of carboxylic acids containing up to 20 carbon atoms, vinyl aromatic compounds containing up to 20 carbon atoms, ethylenically unsaturated nitriles, vinyl halides, non-aromatic hydrocarbons having at least two conjugated double bonds, or mixtures of these monomers.

Furthermore, silicon-containing monomers such as, for example, vinyl trialkoxysilanes including vinyl trimethoxysilane, allyl trialkoxysilanes including allyl trimethoxysilane, (meth)acryloxyalkyl trialkoxysilanes including methacryloxypropyl trimethoxysilane, (meth)acryloxyalkyl alkyldialkoxysilanes including methacryloxypropyl methyldiethoxysilane, (meth)acryloxyalkoxyalkyl trialkoxy silanes including methacryloxyethoxyethyl trimethoxysilane, and mercaptoalkyl trialkoxysilanes including mercaptopropyl trimethoxysilane may also be incorporated at a level of from about 0.01% to about 6%, by weight based on the weight of polymer P dispersed in the dispersion. Low levels of ethylenically-unsaturated monocarboxylic acids such as, for example, from 0 to about 7%, by weight, based on the weight of polymer P dispersed in the dispersion, methacrylic acid or acrylic acid may be incorporated as well.

According to one or more embodiments of the present invention, the aqueous dispersion of at least one polymer P comprises one or more polyacrylate polymers. Preferably, the aqueous dispersion of at least one polymer P is an aqueous polyacrylate dispersion, in which the amount of the other polymers than polyacrylates is less than 5.0% by weight, preferably less than 2.5% by weight, most preferably less than 1.0% by weight, based on the total weight of the aqueous polymer dispersion.

Suitable polyacrylate dispersions and preparation method thereof are described, for example in EP 0490191 A2, DE 19801892 A1, and in EP 0620243.

Suitable polyacrylate polymers consist for the most part of (meth)acrylates of alcohols containing from 1 to 24 carbon atoms ((meth)acrylic acid ester monomers). There are preferably more than 25% by weight of these basic monomer building blocks in the polyacrylate polymers. Further monomer building blocks include, for example, vinyl esters and allyl esters of carboxylic acids containing from 1 to 20 carbon atoms, vinyl ethers of alcohols containing from 1 to 8 carbon atoms, vinyl aromatic compounds, vinyl halides, non-aromatic hydrocarbons containing from 2 to 8 carbon atoms and at least one olefinic double bond, α and β-unsaturated mono- or di-carboxylic acids containing from 3 to 6 carbon atoms, and derivatives thereof (especially amides, esters and salts). The proportions by weight of the monomer building blocks are so selected that the polyacrylate polymer has a glass transition temperature of of −60-+10° C., preferably of −60-0° C., most preferably of −50--10° C.

Preferably, such polyacrylate polymers have a number average molecular weight ($M_n$) in the range of 5,000-200,000 g/mol, preferably 25,000-200,000 g/mol, most preferably 50,000-200,000 g/mol and/or a weight average molecular weight (Mw) in the range of 50,000-800,000 g/mol, preferably 100,000-800,000 g/mol, most preferably 150,000-800,000 g/mol.

Suitable commercially available aqueous polyacrylate dispersions suitable as aqueous dispersion of at least one polymer P include Arconal® S 410, Arconal® V 278, Arconal® DS 5017 Arconal® 290 D, Arconal® A323, Arconal® A378, Arconal® 380, Arconal® S 559, Arconal® S 790, Arconal® 5047 (from BASF), Mowilith® DM 1340 (from Celanese), Primal® CA 162, Primal® E-3362, Primal® 2620, Primal® 928ER, Primal® CA 172, Rhoplex® 4400, and Rhoplex® A920 (from Dow Chemical), Plextrol® D 301 (from Synthomer), Vinnapas® EP17, Vinnapas® EAF68 and Vinnapas® CEF52 (from Wacker).

The aqueous dispersion of at least one polymer P can comprise two or more different polymers, such as polyacrylate polymers having different glass transition temperatures and different monomer compositions. Aqueous polymer dispersions comprising two or more different polyacrylated polymers can be prepared by mixing commercially available polyacrylate dispersions, such as those described above.

Component A can furthermore be prepared by adding dispersible or redispersible polymers P to water or an already prepared dispersion of the same or different polymer P. Dispersible polymers P may thus be added, together with water and/or other additives, to the aqueous dispersion of at least one polymer P to form component A. In particular, the dispersible polymer P is a water-dispersible solid resin. The term "resin" describes a polymeric material that may exhibit cross-linked polymeric structures.

A "water-dispersible" resin means a resin which is capable of being combined by itself with water, with or without requiring the use of a secondary dispersing or emulsifying agent, to obtain an aqueous dispersion or emulsion of polymer or resin particles having at least a one month shelf stability at normal storage temperatures.

The dispersible solid resin used as polymer P can be prepared and used in bulk, powdered form that would be re-dispersed in the water during the formulation of component A. Acronal® S 430 P (BASF SE) is an example of a suitable commercial, re-dispersible styrene-acrylate copolymer powder.

Suitable dispersible solid resins useable as polymer P include, for example, polyvinyl acetate, polyvinyl alcohol, polyacrylates, polyurethanes, polyurethane-acrylates, natural based polymers, carboxylated polystyrene-compolymers, carboxylated butadiene styrene copolymers, carboxylated butadiene rubbers styrene-butadiene copolymers, styrene-isoprene copolymers, ethylene-vinyl acetate copolymers (EVA), ethylene-methacrylate copolymers, ethylene-ethyl acrylate copolymers, ethylene-butyl acrylate copolymers (EBA), ethylene-(meth)acrylic acid copolymers, ethylene-2-ethylhexyl acrylate copolymers, ethylene-acrylic ester copolymers, and polyolefinc block copolymers and all polymers mentioned above comprised in the aqueous dispersion of at least one polymer P.

The above-mentioned copolymers, meaning polymers made from more than one type of monomer, can be block type copolymers or random copolymers. Dispersible solid resins useable as polymer P can also be further functionalized, meaning they can contain further functional groups such as hydroxyl, carboxy, anhydride, acrylate, and/or glycidylmethacrylate groups.

Suitable dispersible solid resins useable as polymer P preferably have a number average molecular weight (Me) in the range of 5,000-200,000 g/mol, preferably 25,000-200,000 g/mol, most preferably 50,000-200,000 g/mol. The number average and molecular weight can be determined by gel permeation chromatography using polystyrene as standard in a polymer solution in tetrahydrofuran.

Component A furthermore optionally comprises up to 2 wt.-% of a nonionic or ionic dispersing agent D. This additive is especially useful in embodiments where dispersible solid resins or polymers P are added to component A, since nonionic or ionic dispersing agent D helps forming a stable and homogeneous dispersion of polymers and resins.

Suitable nonionic or ionic dispersing agent D include surfactants, emulgators, polymeric materials capable to stabilize dispersions and the like, as known to the skilled person in the art of polymer dispersion formulation.

Polymers and resins dispersed in component A may for example, where necessary, be stabilized by the addition of thereto of: an alkali-soluble polymer, such as JONCRYL®675 and JONCRYL® 678; a nitrogen-containing base, such as ammonia or an amine; and/or a nitrogen-free base, such as the inorganic metal bases KOH, CaOH, NaOH and LiOH.

Surfactants are furthermore useful and preferred for use as nonionic or ionic dispersing agent D in component A according to the present invention. Suitable surfactants include anionic, non-ionic, cationic or amphoteric surfactants, but preferably a non-ionic or anionic surfactant is employed.

Suitable non-ionic surfactants include polyethylene oxide condensates of alkylphenols, polyoxyalkylene derivatives of propylene glycol, condensates of ethylene oxide and the reaction product of propylene oxide and ethylene diamine, ethylene oxide condensates of aliphatic alcohols, long chain tertiary amine oxides, long chain tertiary phosphine oxides, long chain dialkyl sulfoxides and the like. Useful anionic surfactants include those obtained by alkylating aromatic nuclei, sulfonating the resulting alkylated aromatic hydrocarbons and neutralizing the sulfonation products. Alkyl benzene sulfonates, such as dodecylbenzenesulfonate are typical of this class. Fatty alcohol sulfates are also useful as surface active agents.

Furthermore suitable and recommended as nonionic or ionic dispersing agent D are polycarboxylate salts, such as polycarboxylate ammonium salts, for example commercially available under the trade name Dispex® dispersing agent by BASF. Another suitable dispersing agent is available under the trade name Lucramul® by Levaco Chemicals.

The amount of nonionic or ionic dispersing agent D used in component A depends on the type and amount of dispersible polymer P and other constituents included in component A. The skilled artisan in the field of resin and polymer dispersions is able to adjust the amount accordingly in order to obtain a stable, homogeneous component A. Some dispersible polymers P do not require nonionic or ionic dispersing agent D at all due to their molecular structure and particle size.

Furthermore, component A of the inventive two-component composition comprises between 0.1 and 15 wt.-%, based on the total weight of component A, of a monovalent metal salt M.

The addition of a monovalent metal salt M has the advantage, that a component A exhibits a lower viscosity compared to an otherwise identical component A that does not include the monovalent metal salt M.

The term "monovalent metal salt" describes a salt that comprises a monovalent metal cation and any anion. Monovalent metals are metal atoms which are present in the stable oxidation state +1, so for example $Na^+$, $K^+$, $Ag^+$, etc.

Suitable for monovalent metal salt M are all monovalent metal cations, in particular alkali metal cations. Preferred are $Na^+$, $K^+$ and $Li^+$, especially $Li^+$.

For the anions to form the monovalent metal salt M, no particular restrictions apply. It is however preferred to use anions of strong inorganic acids, in particular sulfate and nitrate and organic anions, in particular gluconate. Strong anionic bases, such as hydroxide, may negatively influence the compositions, either component A or the mixtures. Halide anions may be used, but they can in some cases have detrimental impact of the mixed compositions, in particular regarding the hydraulic binder.

Most preferably, the monovalent metal salt M has a cation selected from the group consisting of sodium, potassium, and lithium and/or an anion selected from the group consisting of gluconate, nitrate, and sulfate.

In especially preferred embodiments, the monovalent metal salt M is lithium sulfate or lithium sulfate monohydrate.

Preferably, the monovalent metal salt M is comprised in component A in an amount of between 0.2 and 12 wt.-%, in particular between 0.3 and 10 wt.-%, most preferably between 0.5 and 5 wt.-%, based on the total weight of component A.

The most useful amount depends of course on the type of metal salt (especially the type of anion) used. The beneficial effect depends on the amount of metal cation added. Therefore, salts with heavier anions have to be added in larger amounts to yield the same effect. In general, an amount of metal cation between 0.001 and 0.05 mol, in particular between 0.005 and 0.02 mol metal cation per 100 g of component A is preferred.

Component A of the inventive composition may contain other optional additives, such as fillers and plasticizers, among others commonly known to one of average skill in the field of aqueous polymer dispersions.

A filler influences the rheological properties of the uncured composition and also the mechanical properties and the surface nature of the fully cured composition. Suitable fillers are inorganic and organic fillers, as for example natural, ground or precipitated chalks (which consist entirely or primarily of calcium carbonate), and which are optionally coated with fatty acids, more particularly stearic acid; barium sulfate ($BaSO_4$, also called barite or heavy spar), calcined kaolins, aluminum oxides, aluminum hydroxides, silicas, especially finely divided silicas from pyrolysis processes, carbon blacks, especially industrially manufactured carbon black, titanium dioxide, PVC powders, or hollow beads. Preferred fillers are calcium carbonates, calcined kaolins, carbon black, finely divided silicas, and flame-retardant fillers, such as hydroxides or hydrates, especially hydroxides or hydrates of aluminum, preferably aluminum hydroxide.

It is entirely possible and may even be an advantage to use a mixture of different fillers.

According to one or more embodiments, component A of the inventive composition has a solids content of 20-90% by weight, preferably 40-80% preferably 50-75% by weight, most preferably 55-70% by weight. The solids content as used herein refers to the portion of the aqueous dispersion adhesive composition, which when heated to a temperature of 105° C. for one hour at one atmosphere pressure does not volatilize. Accordingly, the solids content refers to polymeric materials, non-volatile plasticizers, inorganic solids and non-volatile organic materials, whereas the non-solid portion is generally comprised of water and any organic materials readily volatilized at 105° C.

Component A may further optionally contain one or more plasticizers. The use of a plasticizer depends on the intended application and the dispersed polymers and resins used. Very soft polymers with a very low $T_g$, such as for example −60° C., do not necessarily require the addition of a plasticizer. Furthermore, if the dispersion sealant composition is intended to be used as an elastic adhesive, plasticizers may also be minimized or omitted in the composition. For uses where a soft joint sealant (with low Shore A hardness) or a coating is required, and/or when using a polymer or resin with a higher $T_g$, such as for example −10° C., the use of a plasticizer may be advantageous. Suitable plasticizers are liquid or solid inert organic substances having a low vapor pressure, preferably having a boiling point of above 200° C. measured at standard pressure. Plasticizers can be selected from the group consisting of adipic and sebacic acid plasticizers, phosphoric acid plasticizers, citric acid plasticizers, fatty acid esters and epoxidised fatty acid esters, polypropylene glycol, polyethylene glycol, benzoates, and phthalates or esters of 1,2-dicarboxy cyclohexane.

Suitable fatty acid esters include alkyl esters of fatty acids containing more than about 14 or more than about 16 carbon atoms, for example the alkyl esters of lauric, myristic, stearic, arachidic and behenic acid and mixtures thereof. Suitable as fatty alcohols are the alcohols of the above-mentioned fatty acids, such as are obtainable from the fatty acids or esters thereof by use of processes known to the person skilled in the art.

Component A of the inventive composition can further comprise one or more tackifiers. Examples of suitable tackifiers may include hydrocarbon resins or hydrogenated products thereof, rosins or hydrogenated products thereof, rosin esters or hydrogenated products thereof, terpene resins or hydrogenated products thereof, terpene phenolic resins or hydrogenated products thereof, and polymerized rosins or polymerized rosin esters or acrylic liquid resins.

Component A of the inventive composition can also contain one or more further additives such as wetting agents, thickeners, anti-foams, flame retardants, stabilizers, colorants, antioxidants, UV-absorbers and/or biocides. Such further additives commonly used in water-based dispersions as additives are known to a person skilled in the art.

Suitable anti-foams are preferably compounds based on mineral oils or silicones. Suitable thickeners include compounds that are based on (meth)acrylic acid copolymers, cellulose derivatives, mineral thickeners such as clays, silica, or mixtures thereof.

Biocides (preservatives) may be added to the sealant compositions according to the present invention in an amount of between 0 wt % and 2 wt %, preferably between 0.2 wt % and 1.8 wt %, more preferably between 0.4 wt % and 1.5 wt %, with respect to the total composition, of a biocide.

In general any known type of biocides, also denoted as preservatives, can be used in the composition of the present invention.

Suitable as preservatives are customary preservatives, for example benzisothiazolinone (BIT), methylisothiazolinone (MIT), octylisothiazolinone (OIT), chloromethyl isothiazolinone (CMIT), and the like.

According to one or more embodiments, the total amount of the further additives is preferably 0-15.0% by weight, more preferably 0-10.0% by weight, based on the total weight of component A.

Component A can be prepared by mixing the ingredients together at room temperature. Any suitable mixing apparatus can be used for the preparation of component A.

The water-based two-component composition according to the present invention comprises a second component B that comprises, based on the total weight of component B:
 between 10 and 30 wt.-% of a nonionic, non-aqueous liquid carrier LC,
 between 0 and 20 wt.-% of calcium sulfate,
 between 10 and 89.9 wt.-% of at least one hydraulic binder H, and
 between 0 and 10 wt.-% of a thixotropy agent T, with the proviso that the second component B furthermore comprises between 0.1 and 25 wt.-% of a polyamine PA.

The Component B of the inventive composition is a stable liquid or paste-like composition which is formed by mixing the hydraulic binder H and calcium sulfate with an non-aqueous (anhydrous) liquid carrier, preferably a liquid plasticizer. In its broadest definition, a plasticizer here is a material that when added to another yields a mixture which is easier to handle or has greater utility. In a refinement of that definition, plasticizer as used herein means an organic or semi-organic liquid which is usually non-volatile at standard temperature and pressure (25° C., 1 atm.) and which has no specific chemical reactivity with the other constituents contained in the composition. As such, this liquid is inert towards the hydraulic binder and merely serves as a medium in which that binder may be suspended or otherwise dispersed.

As mentioned above, the non-aqueous liquid carrier LC is a liquid substance that is used to form a macroscopically homogeneous paste or viscous liquid with the, in most cases solid, further ingredients in component B.

Suitable and preferred non-aqueous liquid carrier LC include liquid plasticizers known to the person of average skill in the field of hydraulic binder and elastic sealant or adhesive compositions. Such plasticizers may be selected from a broad group of compounds as any water free organic liquid with low volatility will be effective. Suitable classes of compounds include polyalkyleneglycols and other polyethers, sulphonated or phosphorylated organic compounds, alkyl or aryl esters of aromatic or aliphatic organic acids, oils from natural or synthetic nature, a variety of vinyl polymers, and polyesters or silicones.

Suitable polyalkyleneglycols include polyethylene glycol, blends with polypropylene glycol or other co-plasticisers to make it liquid, polypropylene glycol and other liquid polyethers in general, e.g. copolymers of ethylene oxide, propylene oxide and/or butylene oxide. Suitable sulphonated or phosphorylated organic compounds include alkyl sulfonic acid ester of phenol and cresol (for example available as Mesamoll) and aromatic sulfonamides. Suitable alkyl or aryl esters of organic acids include benzoic acid esters of glycols and their oligomers (for example available as Benzoflex), esters of 1,2 dicarboxy cyclohexane (Hydrogenated phthalates such as commercially available under the trade name Hexamoll DINCH), phthalic acid esters, terephthalic acid esters, trimellitates, adipic acid esters, sebasic acid esters, tartrate esters, citric acid esters and sucrose esters. Suitable oils from natural or synthetic nature include vegetable oils and their derivatives including fatty acid esters and epoxidised vegetable oils, organic liquids derived from wood and other forest products like liquid rosin esters and hydrocarbon fluids such as mineral oil or paraffinic liquids. Suitable vinyl polymers include polyisobutene, liquid polybutadiene and liquid polyacrylates. Liquid polyesters and silicone fluids are also suitable and available to the skilled person. The above mentioned plasticizers can be used in combination as non-aqueous liquid carrier LC.

Preferably, materials which may be degraded by alkaline hydraulic binders should not be selected from the above mentioned list for use as non-aqueous liquid carrier LC in the present invention. Any such degradation may be detected by the emission of an odor from the binder. Ester based compounds may be susceptible to alkaline environment.

In one embodiment of the invention, it is preferred to use polyethers, vinyl polymers, silicones and oils as non-aqueous liquid carrier LC as this improves long term stability of the formulation.

In another embodiment, it is preferred to use hydrophilic compounds such as polyalkyleneglycols, as the use of these plasticizers improve the ease of mixing with the water phase of the second components.

The selected non-aqueous liquid carrier LC ought also to be compatible with the dispersed polymer(s) and resin(s) of component A. The polarity of the plasticizer—measureable with any method known to a person skilled in the art e.g. the water/octanol partition coefficient—can be used to better match the non-aqueous liquid carrier LC to the dispersed polymer and resin, if comprised. By way of example and without intention to limit the present invention, where the dispersed polymer or resin is a styrene-acrylate copolymer, a more polar plasticizer such as polypropylene glycol, fatty acid methyl esters or alkylsulfonic acid esters might be used. Conversely, where the dispersed polymer is a styrene-butadiene copolymer, a more hydrophobic plasticizer such as mineral oil or a paraffinic liquid might best be used.

The non-aqueous liquid carrier LC and/or the second component B as a whole must be essentially water free. By this is meant that the non-aqueous liquid carrier LC and/or the second component B as a whole contain less than 10 wt.-% water, by weight of the composition, preferably less than 1.0 wt.-%, 0.5 wt.-%, 0.2 wt.-% or 0.1 wt.-% and most preferably 0 wt.-% of water, based on the total weight of component B.

A sufficient amount of non-aqueous liquid carrier LC must be employed to act as a carrier material for the hydraulic binder and to ensure the component B is liquid or at least homogeneously paste-like. The exact amount of non-aqueous liquid carrier LC needed will depend upon the type and amount of hydraulic binder H and calcium sulfate as well as the types and amounts of other additives which may be present in the concentrate.

The resulting mixture is subjected to sufficiently high shear forces to thoroughly disperse the dry component. A broad range of mixers can be used, which are suitable for liquid/powder blends normally used in the paint and adhesives industries. Suitable mixers include a conventional blending mill, like a ball mill or similar, dissolvers, planetary mixers, speedmixers, monomixers and extruder mixers such as the Buss co-kneader and twin screw extruders. The end product may be liquid, viscous, or paste-like (pasteous), with a viscosity up to 100 Pa·s, or higher. The viscosity, time, temperature, total energy input or homogeneity can be used as criterium to end the milling process. The viscosity of the mixture in a preferred embodiment has a value from about 500 to 5,000 mPa·s as measured at 25° C. For viscosities up to 100 000 mPa·s a Brookfield viscosimeter may be used with a choice of spindle and rotational speed suitable for the actual viscosity range. For viscosities above 100 000 mPa·s a plate/plate oscilating rheometer may be used. The mentioned viscosity range is valid for the approximate shear rate of 100 $s_{-1}$.

Component B furthermore preferably comprises, based on the total weight of component B, between 0 and 20 wt.-% of calcium sulfate, preferably between 2 and 18 wt.-%, more preferably between 5 and 15 wt.-%. Herein, "calcium sulfate" means not only $CaSO_4$ as a pure chemical compound, but also natural or synthetic gypsum which may contain traces of impurities. This would include calcium sulfate ($CaSO_4$) and its various forms such as calcium sulfate anhydrate, calcium sulfate hemihydrate and calcium sulfate dihydrate, as well as calcined gypsum, pressure calcined gypsum and plaster of Paris.

Including calcium sulfate has the advantage, that the resulting composition cures faster via the reaction of hydraulic binder H and water.

Using gypsum as a raw material—for subsequent inclusion in component B of the present invention—the gypsum should have a minimum purity of 90% and be preferably finely ground to a particle size such that at least 90 wt. %, and preferably at least 99 wt. % of the gypsum particles, based on the total weight of the gypsum particles will pass through a No. 100 U.S. Standard sieve (150 microns). Such a gypsum plaster is available from a number of commercial sources. For instance, a preferred α-calcium sulfate hemihydrate (alpha gypsum) is DynaPlast™ Base Alpha available from Allied Custom Gypsum Plasterworks, L.L.C.

Component B furthermore comprises, based on the total weight of component B, between 10 and 89.9 wt.-% of at least one hydraulic binder H.

Herein the expression "hydraulic binder" is understood to mean a, in most cases pulverulent, material which, mixed with water, forms a paste which sets and hardens by a series of hydration reactions and processes and which, after hardening, retains its strength and its stability even under water.

A hydraulic binder or hydraulic binding agent is thus a substantially inorganic or mineral material or blend, which hardens when mixed with water. Hydraulic binders also encompass latent hydraulic binders or pozzolanic binders which usually require activation, e.g. by the presence of lime, in order to show hydraulic properties. All hydraulic binders known to those skilled in the art are suitable.

Typical examples of hydraulic binders are at least one of cement, e.g. Portland cement, fly ash, granulated blast furnace slag, lime, such as limestone and quicklime, rice husk, calcined paper sludge, fumed silica and pozzolana or a mixture thereof.

A preferred hydraulic binder H is Portland cement.

The term "Portland cement" as used herein is intended to include those cements normally understood in the art to be "Portland cement" such as those described in British Standards Institution (BSI) EN-197 and American ASTM Standard C-150 and European Standard EN-197. The types CEM I and CEM II compositions of the latter standard are preferred for use in the present invention, although other forms of Portland cement are also suitable. Portland cement consists mainly of tri-calcium silicate and dicalcium silicate.

The Portland Cement—for subsequent inclusion in the liquid first component of the present invention—preferably has an air permeability specific surface area (Blaine value) of from 3000 to 9000 $cm^2/g$, preferably from 4000 to 6000 $cm^2/g$.

The term "storage stable" as it applies to the component B of the formulation which contains the hydraulic binder, is intended to mean that the hydraulic binder therein remains reactive towards water when mixed therewith after a period of storage, typically up to 1 year or greater.

In preferred embodiments, the hydraulic binder comprises calcium aluminate, also known as aluminate cement and/or calcium sulfoaluminate. The term "aluminate cement" as used herein is intended to include those cementitious materials normally understood in the art to contain as the main cementitious constituent, mono calcium aluminate (CaO× $Al_2O_3$). This would include high alumina cement (HAC), calcium aluminate cement, and many other commercially available alumina cements. High alumina cement is normally understood in the art to contain greater than 15% of mono calcium aluminate.

The air permeability specific surface area (Blaine value) of the high alumina cement is preferably more than 2000, more preferably from 3000 to 9000 $cm^2/g$. This fineness of the raw material facilitates its wetting and/or dispersion in the anhydrous, inert liquid of the first component. The hydraulic binder H may be included in form of powder, or partially, in form of clinker. For example, in preferred embodiments, calcium aluminate and/or calcium sulfoaluminate clinkers are included in the hydraulic binder H.

Especially preferred embodiments contain as hydraulic binder H Portland cement and calcium aluminate and/or calcium sulfoaluminate clinkers.

For these embodiments, components B preferably comprise between 5 and 50 wt.-%, preferably between 10 and 40 wt.-%, more preferably between 15 und 30 wt.-%, based on the total weight of component B, Portland cement and between 10 and 70 wt.-%, preferably between 15 and 60 wt.-%, more preferably between 20 und 50 wt.-%, based on the total weight of component B, calcium aluminate and/or calcium sulfoaluminate clinkers.

In addition, component B optionally but preferably comprises rheology modifiers, thickeners, or thixotropic additives, herein called thixotropy agents T, with an amount of between 0 and 10 wt.-%, preferably between 1 and 5 wt.-%, based on the total weight of component B. Suitable as thixotropy agents T are for example urea compounds of the type described as thixotropy agents ("Thixotropy endowing agent") in WO 02/48228 A2 on pages 9 to 11, polyamide waxes, bentonites or pyrogenic silicas. These additives are especially suitable for compositions with lower viscosities, for example <15 Pa·s, since they allow formulating a smoother, more homogeneous composition that does not easily run off when applied to a surface with a slope.

Furthermore, component B comprises between 0.1 and 25 wt.-%, preferably between 0.2 and 10 wt.-%, more preferably between 0.3 and 1 wt.-%, based on the total weight of component B, of a polyamine PA.

The most useful amount depends of course on the type of polyamine used, especially concerning molecular weight. The beneficial effect depends on the amount of amino groups added. Therefore, polyamines with higher molecular weight generally have to be added in larger amounts to yield the same effect, compared to polyamines with the same amount of amino groups but lower molecular weight. In general, an amount of polyamine of between 0.0005 and 0.05 mol, in particular between 0.001 and 0.01 mol polyamine PA per 100 g of component B is preferred.

By "poly" in "polyamine" is meant molecules which formally contain two or more amino groups. Preferably, these amino groups are primary or secondary amino groups, more preferably primary amino groups. Preferably, the polyamine PA has aliphatic amino groups that may be attached to an aliphatic, cycloaliphatic or arylaliphatic radical. They consequently differ from the aromatic amines, in which the amino groups are attached directly to an aromatic radical, such as in aniline or 2 aminopyridine, for example.

Suitable polyamines PA having aliphatic primary amino groups are customary polyamines such as are used, for example, in polyurethane or epoxy chemistry. Examples that may be mentioned include the following: aliphatic polyamines such as ethylenediamine, 1,2- and 1,3-propanediamine, 2-methyl-1,2-propanediamine, 2,2-dimethyl-1,3 propanediamine, 1,3- and 1,4-butanediamine, 1,3- and 1,5-pentanediamine, 1,6-hexanediamine, 2,2,4- and 2,4,4-trimethylhexamethylenediamine and mixtures thereof, 1,7-heptanediamine, 1,8-octanediamine, 4-aminomethyl-1,8-octanediamine, 1,9-nonanediamine, 1,10-decanediamine, 1,11-undecane-diamine, 1,12-dodecanediamine, methylbis(3-aminopropyl)amine, 1,5-diamino-2-methylpentane (MPMD), 1,3-diaminopentane (DAMP), 2,5-dimethyl-1,6 hexamethylenediamine, cycloaliphatic polyamines such as 1,2-, 1,3- and 1,4-diaminocyclohexane, bis(4-aminocyclohexyl)methane, bis(4-amino-3 methylcyclohexyl)methane, bis(4-amino-3-ethylcyclohexyl)methane, bis(4 amino-3,5-dimethylcyclohexyl)methane, 1-amino-3-aminomethyl-3,5,5-tri-methylcyclohexane isophoronediamine or IPDA), 2- and 4-methyl-1,3 diaminocyclohexane and mixtures thereof, 1,3- and 1,4-bis(aminomethyl)-cyclohexane, 1-cyclohexylamino-3-aminopropane, 2,5(2,6)-bis(aminomethyl)-bicyclo[2.2.1]heptane (NBDA, manufactured by Mitsui Chemicals), 3(4),8(9)-bis-(aminomethyl)tricyclo[5.2.1.02,6]decane, 1,4-diamino-2,2,6-trimethylcyclohexane (TMCDA), 3,9-bis(3-aminopropyl)-2,4,8,10-tetraoxaspiro[5.5]undecane, 1,3- and 1,4-xylylenediamine, aliphatic polyamines containing ether groups, such as bis(2-aminoethyl)ether, 4,7-dioxadecane-1,10-diamine, 4,9-dioxadodecane-1,12-diamine and higher oligomers thereof, polyoxyalkylene-polyamines having in theory two or three amino groups, obtainable for example under the name Jeffamine® (manufactured by Huntsman Chemicals), and also mixtures of the aforementioned polyamines. Preferred polyamines PA are 1,6-hexamethylenediamine, MPMD, DAMP, 2,2,4- and 2,4,4-trimethylhexamethylenediamine, 4-aminomethyl-1,8-octane-diamine, IPDA, 1,3- and 1,4-xylylenediamine, 1,3- and 1,4-bis(aminomethyl)-cyclohexane, bis(4-aminocyclohexyl)methane, bis(4-amino-3-methylcyclo-hexyl)methane, 3(4),8(9)-bis(aminomethyl)tricyclo[5.2.1.02,6]decane, 1,2-, 1,3- and 1,4-diaminocyclohexane, polyoxyalkylene polyamines, in particular polyoxypropylene amines, having in theory two or three amino groups, especially Jeffamine® EDR-148, Jeffamine® D-230, Jeffamine® D-400 and Jeffamine® T-403, and, in particular, mixtures of two or more of the aforementioned polyamines.

Use of a polyamine PA in component B has the advantage that a component B exhibits a lower viscosity compared to an otherwise identical component B that does not include the polyamine PA.

A water-based cementitious sealant or adhesive according to the present invention, comprising a component A and a component B as described above, is mixed before application by mixing the two components A and B into a homogeneous mixture. Any static or dynamic mixing device or method can be used, as long as a macroscopically homogeneous mixture can be obtained.

Preferably, taking into account the individual amounts preferred for the constituents of components A and B, the mixing weight ratio of component A:component B is between 5:1 and 1:5, preferably between 1.5:1 and 1:1.5.

After mixing, the mixed two-component composition according to the present invention has a pot-life at room temperature of between 10 min and 180 min, during which application has to be performed. Preferred embodiments have a pot-life of between 15 and 120 min, preferably between 20 and 110 min. The individual pot-life depends mainly on the amount and type of hydraulic binder and influencing additives, such as accelerators. After this time, the curing progress of the hydraulic binder makes a subsequent application difficult or impossible.

The inventive two-component composition is especially suitable for adhesively sealing joints in or coating substrates of wood, plastic, such as PVC, or metal, mineral substrates such as plaster flooring, natural stone, concrete, cementitious levelling compounds or gypsum-based levelling compounds.

According to another aspect of the present invention, a method for adhesively joining two substrates is provided, the method comprising steps of:
  i) Mixing the two components of a two-component composition according to any of claims 1 to 10 in a weight ratio of component A:component B of between 5:1 and 1:5,
  ii) Applying the thus-obtained water-based cementitious adhesive to a first substrate to form a wet film or bead of adhesive on the first substrate, or applying the thus-obtained water-based cementitious adhesive to a first substrate and to a second substrate to form a wet film or bead of adhesive on both substrates, or applying the thus-obtained water-based cementitious adhesive into a gap between a first substrate and a second substrate to bridge the gap between the two substrates,
  iii) Optionally exposing the wet film to air,
  iv) Joining a second substrate to the first substrate, if necessary, such that the wet film or bead on the first substrate is in contact with the second substrate, or such that both wet films or beads on both substrates are in contact with each other, to effect bonding there between.

The dispersion adhesive, sealant, or coating composition can be applied on the surface of the substrate using for example, a toothed trowel or a roller.

According to another aspect of the present invention, use of the a two-component composition of the present invention after mixing or a water-based cementitious sealant or adhesive for sealing a joint between one or two substrates and/or for coating a surface on a substrate is provided.

According to still another aspect of the present invention, use of a monovalent metal salt M in component A of a two component composition and/or a polyamine PA in component B of a two component composition to decrease the viscosity of the mixture of component A and component B is provided.

Yet another aspect of the present invention is a dried water-based cementitious sealant or adhesive according to the present invention.

EXAMPLES

The invention is further explained in the following experimental part which, however, shall not be construed as limiting to the scope of the invention. The proportions and percentages indicated are by weight, unless otherwise stated. Accordingly, "wt.-%" means percentage by weight, based on the weight of the total composition given in the respective case. "RT" means room temperature or ambient temperature and describes a temperature of 23° C. The abbreviation "r.h." or "% r.h." means relative humidity (in %) of the ambient air in a given example or test method.

Test Methods

Tensile strength and the elongation at break were determined according to DIN 53504 (tensile speed: 200 mm/min) on films with a layer thickness of 2 mm, cured for 14 days at 23° C. and 50% relative humidity.

Tear propagation resistance was determined according to DIN 53515, on films with a layer thickness of 2 mm, cured for 7 days at 23° C. and 50% relative humidity.

Shore A hardness was determined according to DIN 53505 on samples with a layer thickness of 6 mm, cured for 7 days at 23° C. (RT) and 50% relative humidity and using the same samples after additional 7 days water immersion.

Viscosity was measured according to DIN 53018 at a temperature of 20° C. and using shear rate of 100 $s^{-1}$.

Adhesion was tested on selected substrates using a bead adhesion test. For this, a cut is made between the cured adhesive and the substrate just above the adhesion interface. The incised end of the bead is held by hand and pulled away from the substrate. This is done by carefully rolling up the bead away from the adhesion interface, and by placing a cut vertical down to the bare substrate to the bead pulling direction. The bead removal rate should be selected so that about every 3 seconds a fresh cut is made. The test track must be at least 5 cm. An assessment is made by peeling off the bead on the surface residual adhesive (cohesive failure assessment). The adhesion properties are evaluated by estimating the cohesive component of the adhesion interface:
  1=more than 95% cohesive failure (less than 5% adhesive failure)
  2=76-95% cohesive failure
  3=25-75% cohesive failure
  4=less than 25% cohesive failure
  5=0% cohesive failure (purely adhesive failure).

An adhesion with more than 75% cohesive failure is considered sufficient.

Preparation of the Thixotropy Modifier

In a Vacuum mixer, 1000 g diisodecyl phthalate (DI DP, Palatinol® Z, BASF SE, Germany) and 160 g 4,4'-diphenylmethane diisocyanate (Desmodur® 44 MC L, Bayer MaterialScience AG, Germany) were placed and slightly heated. Then 90 g monobutylamine were dropped in slowly under vigorous agitation. The white paste produced was further agitated for 1 hour under vacuum and cooling. The thixotropy modifier contains 20 wt.-% thixotropy agent T in 80 wt.-% diisodecyl phthalate.

Raw Materials

The raw materials and their description regarding important properties which were used for the example sealant compositions are shown in Table 1.

TABLE 1

Raw materials used for the example compositions.

| Raw material | Description |
| --- | --- |
| Aqueous dispersion of polymer P1 | Aqueous anionic dispersion of a styrene acrylate copolymer (ca. 50% solids, mean particle size ca. 0.15 μm) |
| Dispersible polymer P2 | Flexible dispersible polymer powder based on vinyl acetate, ethylene and vinyl ester |
| Dispersing agent D1 | C8 alcohol ethoxylate (non-ionic surfactant) |
| Dispersing agent D2 | Aqueous sodium polyacrylate (ca. 35% solids) dispersant |
| Liquid carrier LC1 | Non-ionic ethylene oxide (EO)-propylene oxide (PO) copolymer, Mn = 1500 g/mol |
| Alpha gypsum | $CaSO_4$ ½ $H_2O$ (hemihydrate) |
| Hydraulic binder H1 | Blend of belitic calcium sulfoaluminate clinker and calcium sulfate |

TABLE 1-continued

Raw materials used for the example compositions.

| Raw material | Description |
|---|---|
| Hydraulic binder H2 | Portland cement CEM I 42.5N |
| Jeffamine T403 | Trifunctional polyetheramine based on oxypropylene repeating units. Mn = 440 g/mol. |
| Liquid carrier LC2 | Diisodecylphthalate (DIDP) |

Example Compositions

Several component A and component B compositions were prepared from the raw materials in Table 1 using the following procedure.

Mixing Procedure

All example compositions A were prepared in a lab mixer using the following procedure:
a) Addition of the other raw materials to the aqueous dispersion of at least one polymer PD;
b) Mixing under vacuum and filling of the preparations into cartridges.
c) Storing the cartridges for at least 24 h at 23° C. and 50% r.h. prior to mixing with component B and initiating the testing procedure.

The example components A thus prepared are shown in Tables 2 and 7. The numbers refer to wt.-% of the individual ingredients based on the total weight of the respective component A.

TABLE 2

Example components A

| Ingredient (wt.-%) | A1 | A2 | A3 | A4 | A5 | A6 |
|---|---|---|---|---|---|---|
| Aqueous dispersion of polymer P1 | 87.7 | 85.1 | 83.3 | 84.2 | 79.8 | 80.7 |
| Dispersible polymer P2 | 11.0 | 11.0 | 11.0 | 11.0 | 11.0 | 11.0 |
| Dispersing agent D1 | 0.8 | 0.8 | 0.8 | 0.8 | 0.8 | 0.8 |
| Dispersing agent D2 | 0.5 | 0.5 | 0.5 | 0.5 | 0.5 | 0.5 |
| Sodium gluconate | — | — | 4.4 | — | 4.4 | 4.4 |
| Sodium sulfate | — | — | — | 3.5 | 3.5 | — |
| Lithium sulfate monohydrate | — | 2.6 | — | — | — | 2.6 |
| TOTAL | 100 | 100 | 100 | 100 | 100 | 100 |

All example compositions B were prepared in a lab mixer using the following procedure:
a) Addition of the other raw materials to the non-aqueous liquid carrier LC;
b) Mixing under vacuum until a homogeneous paste or liquid is obtained and filling of the preparations into cartridges.
c) Storing the cartridges for at least 24 h at 23° C. and 50% r.h. prior to mixing with component A and initiating the testing procedure.

TABLE 3

Example components B

| Ingredient (wt.-%) | B1 | B2 | B3 | B4 |
|---|---|---|---|---|
| Liquid carrier LC1 | 24.0 | 28.0 | 24.0 | — |
| Liquid carrier LC2 | — | — | — | 24.0 |
| Alpha gypsum | 9.1 | 9.1 | 9.1 | 9.1 |
| Thixotropy modifier | 3.0 | 3.0 | 3.0 | 3.0 |
| Hydraulic binder H1 | 34.9 | 34.9 | 39.9 | 34.9 |
| Hydraulic binder H2 | 29.0 | 24.5 | 24.0 | 29.0 |
| Jeffamine T403 | — | 0.5 | — | — |
| TOTAL | 100 | 100 | 100 | 100 |

The example components B thus prepared are shown in Tables 3 and 8. The numbers refer to wt.-% of the individual ingredients based on the total weight of the respective component B.

Test Results

The results of the mechanical and adhesion test methods, as well as mixing details used on each example composition obtained from mixing individual components A and components B are shown in Tables 4 and 5.

TABLE 5

Test results and mixing ratios

| Example composition | R4 | I3 | I4 | I5 | I6 | I7 |
|---|---|---|---|---|---|---|
| Component A, B type | A1, B3 | A3, B3 | A4, B3 | A2, B3 | A5, B3 | A6, B3 |
| Weight mixing ratio A:B | 1:1 | 1:1 | 1:1 | 1:1 | 1:1 | 1:1 |
| Test method (conditions) [unit] | | | | | | |
| Pot life (RT) [min] | 25 | 40 | 25 | 23 | 35 | 38 |
| Shore A (6 mm) (7 d RT) | 81 | 26 | 76 | 79 | 52 | 77 |
| Adhesion to steel (7 d RT) | 1 | 1 | 1 | 1 | 1 | 1 |
| Adhesion to smoothed concrete (7 d RT) | 3 | 2 | 3 | 1 | 2 | 1 |
| Adhesion to oak wood (7 d RT) | 4 | 3 | 3 | 2 | 3 | 3 |
| Tensile strength [MPa] | 1.51 | 1.44 | 1.38 | 1.8 | 1.43 | 1.18 |
| Elongation at break [%] | 39 | 246 | 62 | 78 | 222 | 279 |
| Tear resistance [N/mm] | 10.4 | 9.1 | 8.9 | 9.1 | 10.3 | 9.7 |

Viscosity Test Results

In order to demonstrate the impact of the additives according to the present invention, Table 6 shows an example component A without additive (A1) and an example component A with additive (A2), as well as an example component B without additive (B1) and an example component B with additive (B2). Furthermore, a non-inventive mixture of A1 and B1 as well as an inventive mixture of A2 and B2 are shown.

TABLE 6

Example components B

| Viscosity [Pa s] | A1 | A2 | B1 | B2 | A1 + B1 | A2 + B2 |
|---|---|---|---|---|---|---|
| Components A or B or mixtures of A and B using a weight ratio A:B of 1:1. | 1.47 | 0.34 | 11.8 | 5.2 | 6.7 | 2.7 |

To further demonstrate the influence of the additives according to the present invention on the viscosity of component A and/or component B, one component A (A1) and two components B (B1 and B4) were used as base compositions.

To these components A and B, a series of additives according to and not according to the present invention were added, accompanied by measurement of their respective viscosity by the method specified above and immediately after addition of the additive and mixing. The results of these experiments are shown in Tables 7 to 9.

TABLE 7

Influence of additives on viscosity in component A

| A1 + additive | Amount additive (g/100 g A1) | Viscosity (shear rate 100 s$^{-1}$) [Pa s] |
|---|---|---|
| No additive | 0 | 1.47 |
| Li$_2$SO$_4$•H$_2$O (0.02 mol) | 2.6 | 0.37 |
| Li$_2$SO$_4$•H$_2$O (0.005 mol) | 0.64 | 1.03 |
| NaCl (0.02 mol) | 1.2 | 0.87 |
| NaCl (0.005 mol) | 0.3 | 1.08 |
| K$_2$SO$_4$ (0.02 mol) | 3.5 | 0.51 |
| K$_2$SO$_4$ (0.005 mol) | 0.9 | 1.24 |
| NaNO$_3$ (0.02 mol) | 1.7 | 0.84 |
| NaNO$_3$ (0.005 mol) | 0.4 | 1.02 |
| CaCl$_2$ (0.02 mol) | 2.2 | 7.4 |
| CaCl$_2$ (0.005 mol) | 0.55 | 50.6 |
| Al$_2$(SO$_4$)$_3$•16 H$_2$O (0.02 mol) | 12.6 | Coagulated |
| Al$_2$(SO$_4$)$_3$•16 H$_2$O (0.005 mol) | 3.15 | Coagulated |

As can be seen in Table 7, addition of di- or trivalent metal cations to component A leads not to a decrease, but to a sharp increase or even solidification of the mixture.

TABLE 8

Influence of additives on viscosity in component B

| B1 + additive | Amount additive (g/100 g B1) | Viscosity (shear rate 100 s$^{-1}$) [Pa s] |
|---|---|---|
| No additive | 0 | 11.8 |
| Jeffamine T403 (0.0012 mol) | 0.53 | 7.95 |
| Ethylene diamine (0.0012 mol) | 0.1 | 8.74 |
| Monobutyl amine (0.0012 mol) | 0.1 | 9.31 |

TABLE 9

Influence of additives on viscosity in component B

| B4 + additive | Amount additive (g/100 g B4) | Viscosity (shear rate 100 s$^{-1}$) [Pa s] |
|---|---|---|
| No additive | 0 | 10.6 |
| Jeffamine T403 (0.0012 mol) | 0.53 | 6.83 |
| Ethylene diamine (0.0012 mol) | 0.1 | 7.73 |
| Monobutyl amine (0.0012 mol) | 0.1 | 9.64 |

Similarly, as seen in Tables 8 and 9, monoamines do not lead to such a significant decrease in viscosity as polyamines when added to component B, independent of the non-aqueous liquid carrier LC used.

The invention claimed is:

1. A two-component composition comprising:
   A) a first component A, comprising, based on the total weight of component A:
      a1) between 68 and 99.9 wt.-% of an aqueous dispersion of at least one polymer P, the aqueous dispersion of at least one polymer P comprising the polymer P with an amount of between 20 and 90 wt.-%, based on the weight of the dispersion;
      a2) between 0 and 2 wt.-% of a nonionic or ionic dispersing agent D;
   B) a second component B, comprising, based on the total weight of component B:
      b1) between 10 and 30 wt.-% of a nonionic, non-aqueous liquid carrier LC,
      b2) between 0 and 20 wt.-% of calcium sulfate,
      b3) between 10 and 89.9 wt.-% of at least one hydraulic binder H,
      b4) between 0 and 10 wt.-% of a thixotropy agent T;
      wherein both components A and B are prepared and stored separately and mixed directly before application; and
      with the proviso that the first component A furthermore comprises:
         a3) between 0.1 and 15 wt.-% of a monovalent metal salt M,
      and the second component B furthermore comprises:
         b5) between 0.1 and 25 wt.-% of a polyamine PA.

2. The two-component composition according to claim 1, wherein the first component A furthermore comprises:
   a3) between 0.1 and 5 wt.-% of a monovalent metal salt M,
   and the second component B furthermore comprises:
   b5) between 0.1 and 25 wt.-% of a polyamine PA.

3. The two-component composition according to claim 1, wherein the monovalent metal salt M has a cation selected from the group consisting of sodium, potassium, and lithium and/or an anion selected from the group consisting of gluconate, nitrate, and sulfate.

4. The two-component composition according to claim 1, wherein the monovalent metal salt M is lithium sulfate or lithium sulfate monohydrate.

5. The two-component composition according claim 1, wherein the component A comprises between 25 and 75 wt.-% of the at least one polymer P.

6. The two-component composition according to claim 1, wherein component A comprises at least 0.2 wt.-%, based on the total weight of component A, of a nonionic or ionic dispersing agent D.

7. The two-component composition according to claim 1, wherein the nonionic, non-aqueous liquid carrier LC comprises a polyoxyalkylene polymer.

8. The two-component composition according to claim 1, wherein the hydraulic binder H comprises Portland cement and calcium aluminate and/or calcium sulfoaluminate clinkers.

9. The two-component composition according to claim 1, wherein component B comprises at least 1 wt.-%, based on the total weight of component B, of a thixotropy agent T.

10. The two-component composition according to claim 1, wherein the polyamine PA comprises a polyoxypropylene amine.

11. A water-based cementitious sealant or adhesive, obtained from mixing a two-component composition according to claim 1 in a mixing weight ratio of component A:component B of between 5:1 and 1:5.

12. A method for adhesively joining two substrates, the method comprising the steps of:
   i) mixing the two components of a two-component composition according to claim 1 in a weight ratio of component A:component B of between 5:1 and 1:5,
   ii) applying the thus-obtained water-based cementitious adhesive to a first substrate to form a wet film or bead of adhesive on the first substrate, or applying the thus-obtained water-based cementitious adhesive to a first substrate and to a second substrate to form a wet film or bead of adhesive on both substrates, or applying the thus-obtained water-based cementitious adhesive into a gap between a first substrate and a second substrate to bridge the gap between the two substrates,
   iii) optionally exposing the wet film to air,
   iv) joining a second substrate to the first substrate, if necessary, such that the wet film or bead on the first substrate is in contact with the second substrate, or such that both wet films or beads on both substrates are in contact with each other, to effect bonding there between.

13. A method of using a two-component composition according to claim 1 after mixing of the components A and B, the method comprising
   adhesively joining two substrates together with the two-component composition.

14. A dried water-based cementitious sealant or adhesive according to claim 11.

* * * * *